Feb. 15, 1927.
J. E. HOOPER
1,617,597
FILTER CLOTH
Filed March 15, 1926
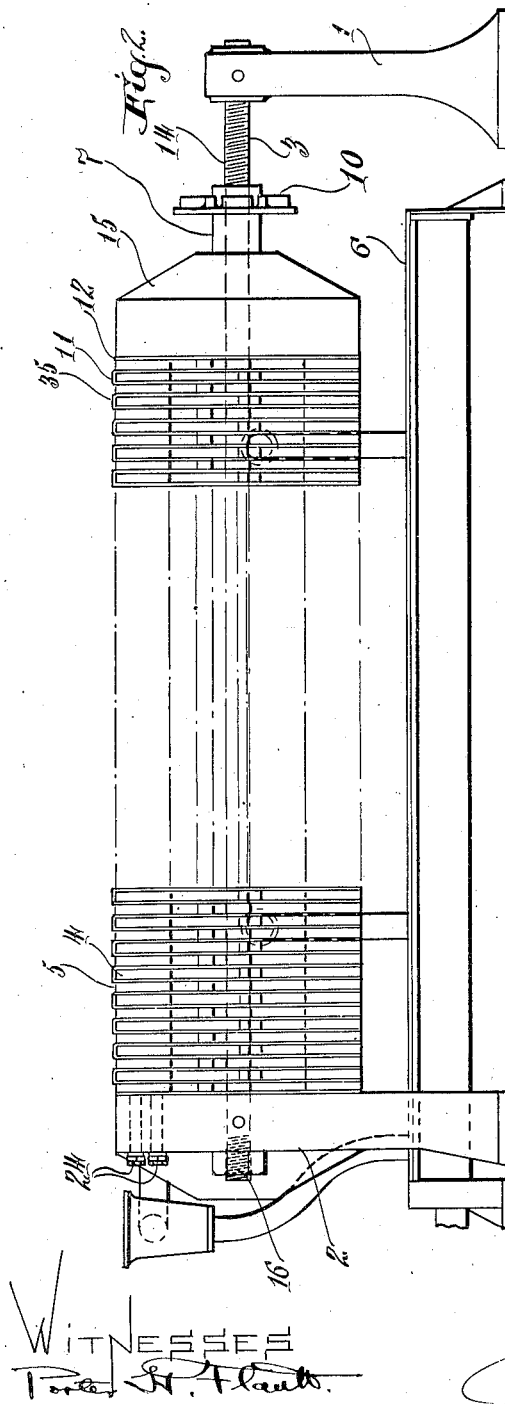
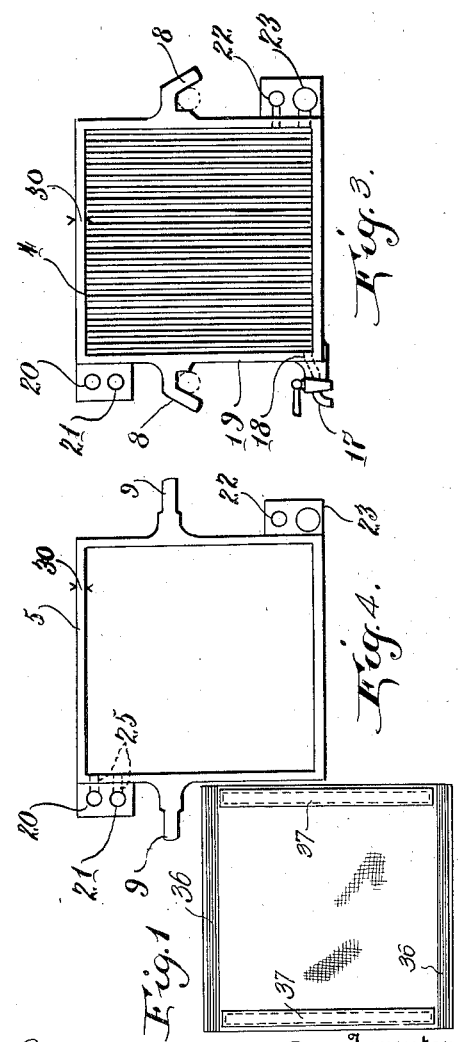

Patented Feb. 15, 1927.

1,617,597

UNITED STATES PATENT OFFICE.

JAMES E. HOOPER, OF RUXTON, MARYLAND, ASSIGNOR TO WILLIAM E. HOOPER & SONS COMPANY, OF BALTIMORE, MARYLAND, A CORPORATION OF MARYLAND.

FILTER CLOTH.

Application filed March 15, 1926. Serial No. 94,861.

The invention relates particularly to the type of filtering apparatus known as a filter press, which consists of a series of alternately placed frames, and plates spaced by the frames, the plates and frames being each provided with openings at the sides transverse to the plane of the plate or frame, which when the plates are assembled in alignment and clamped together by longitudinal screws or other suitable clamping means, form longitudinal passages through which the material to be filtered is introduced under pressure, and part of the filter members, preferably the frames, have lateral passages leading from the longitudinal passages to each of the chambers or spaces formed between the plates by the interposition of the frames. Also in the form of the invention shown each of the plates is provided with a drip cock or tap. The details of the press are not essential.

In the operation of the filter the frames and plates are assembled with filter cloths interposed between each frame and the adjacent plate on each side. The cloths are held by the pressure applied in clamping the plates and frames in series, as described. The material being filtered is pumped into one or more of the longitudinal passages and enters the chambers or spaces formed between the plates by the interposition of the frames. The liquid then passes in both directions through the cloth toward the plates, which are preferably scored to provide drainage of the liquid to the taps from which it is dropped into a suitable trough or other receptacle. In this way the solid or material, being separated from the liquid, is accumulated in the frames, forming a filter cake in each frame which may be removed by reverse washing or by knocking down the filter and removing the cakes, depending on the nature of the material being handled.

The present invention relates particularly to the filter cloth construction. The filter plates ordinarily have raised edge portions which engage the cloth at the edges and, the material being pumped into the filters at a comparatively high pressure, a considerable degree of stress is applied to the cloth. Also, in order to hold the cloth at the edges and make the filter tight, a heavy pressure is exerted by the clamping means which holds the plates and frames in assembled position, pressing them together in the direction of the length of the filter transversely to the planes of the filter cloths, which are substantially parallel. The stress applied to the filter cloth in filtering and the pressure applied to the plates and frames to hold them and the cloths in assembled position and to make the filter tight have a very considerable effect in the way of abrading and destroying the filter cloths, as to the edge portions, particularly the areas clamped between the plates and frames. This results in leakage from the filter between the plates and frames and tearing of the cloths, which permits the solid matter to pass with the liquid and makes frequent renewal of the cloths necessary.

The object of the present invention is to overcome the difficulties described. It relates particularly to the provision of a filter cloth which is so reinforced as to offer increased resistance to the most destructive stresses, the reinforcement being preferably in the form of thickened portions so placed as to be interposed between the plates and frames. These thickened portions have the effect of a gasket or packing perfecting the contact between the plates and frames and preventing leakage at all times, leakage and loss of filtrate with the ordinary filter cloths being unavoidable. The provision of the reinforced areas, so located as to be interposed between the plates and frames, also has the effect of avoiding early destruction of the cloth by wear at the edges, without thickening the main body or central portion of the cloth, which would interfere with the filtering operation and add unduly to the expense of the cloths.

In the accompanying drawing I have illustrated a filter cloth embodying the features of my invention and so much of a filter press as is necessary to a full comprehension of the nature and manner of application of the same.

In the drawings:

Fig. 1 is a plan view of a cloth of preferred form, part of the reinforcement being woven;

Fig. 2 is a side elevation of a filter press, the central plates and frames being omitted for convenience of illustration;

Fig. 3 is an elevation of a filter plate removed;

Fig. 4 is a corresponding elevation of a filter frame removed.

Referring to the drawings by numerals, each of which is used to indicate the same or similar parts in the different figures, The filter press, as shown, comprises uprights 1 and 2 at each end of the press, tension screws 3, a series of alternate plates 4 and frames 5, and a trough 6 into which the liquid filtrate is drained from the press.

The tension screws 3 are nonrotatively secured at their ends in the uprights 1, 2 and the plates 4 and frames 5 are supported on and between the screws by means of ears 8, 9 projecting from the sides intermediately of the vertical dimension and preferably above the centers. The filter cloths 11 and 12 are placed between each adjacent plate and frame and the plates and frames are drawn or pressed together by means of nuts 7 engaging the threads 14 on the screws 3 to form a liquid tight or substantially tight container. For this purpose a bar may be inserted between the lugs 10 on the nut. The head member 15 is mounted to slide on the screws and transmits the pressure of the nuts 7 to the plates and frames. The upright 2 having the ends 16 of the screws rigidly secured therein acts as an abutment against which the pressure applied by the screws to the frames and plates reacts. Each of the plates 4 is provided with a tap or drain cock 17 at the base with a passage 18 leading through the rim 19 of the plate to the cock and both the plates and frames are provided with registering passages 20, 21, 22, 23 transverse to the plates which form continuous longitudinal passages at the sides of the press when the plates and frames are assembled. The passages formed by the registering openings 20 and 21 are connected to fittings or nipples 24 at the end of the press, which nipples are adapted to be connected in turn to a supply of material to be filtered, which supply is delivered under pressure by a pump or other suitable means. The openings 20, 21 in the frame are connected by passages 25 to the interior of the frames, to admit the liquid to be filtered. The solid material accumulates in the frames and the liquid having passed through the filter cloths covering each plate is permitted to flow into the trough through the taps 17, which are on the back side of the filter as shown in Figure 7. The registering passages 20 and 21 admit the material to be filtered between the filtering cloths through the passages 25 in the frames 5; the registering passages 22, 23, as shown in Fig. 4, are provided with conduits in the plates 4 to receive the filtered material and conduct it to other plates and drain cocks or taps, thus providing what may be termed an open system.

It will be apparent that the edges of the cloths must serve as gaskets between the plates and frames to make the filter press tight when assembled and further that the edges of the cloths are subject to excessive stress, wear, abrasion, jamming and cutting due not only to the pressure of the plates, but to the filtering pressure and the repeated clamping. To thicken the cloths throughout would result in an undue increase of expense and the cloths having edge portions of a thickness and texture to give the desired filtering effect are soon jammed, bruised, abraded and torn at the edges to such an extent as to result in leakage of the liquid from the filter with consequent waste, and in leakage of the solid material through the openings formed at the edges of the cloths so that an impure filtrate is delivered from the machine.

The difficulties thus encountered have been overcome by the present invention, which provides a filter cloth having thickened portions 36 corresponding to and registering with the contacting portions of the filter plates and frames 4 and 5. This thickened portion 36 acts as a gasket to prevent leakage from the filter between the plates and frames and also serves as a reinforcement to prevent unduly rapid wear and abrasion, cutting, etc., of the cloths at the edges which would result in undue curtailment of the useful life of the filter cloths. This improvement effects an important economy by not only preventing leakage between the plates and frames, but by greatly increasing the life of the filter cloths with a comparatively slight increase in the expense of production.

As shown in Fig. 1, a preferred form of the cloth has two sides of the square area or outline of the thickened portion at 36 formed by weaving, extra heavy or extra warp threads or yarn or weft threads or yarn being introduced into the fabric throughout the areas indicated for this purpose. As to the other two sides of the square at 37 the thickened portion may be formed in any convenient manner.

The operation of the device has been fully described in the preamble and specification. While the filter plates and frames have been described as square or rectangular, it is, of course, apparent that they may be of any preferred outline and that the filter cloths and thickened areas of the filter cloths must be of corresponding outline.

I have thus described specifically and in detail a preferred form of filter cloth embodying my invention, and have described so much of a filter press as is regarded as necessary to a complete comprehension of my invention and the manner of utilizing the same, the description being specific and in detail in order that the invention and manner of applying the same may be easily understood, however, the specific terms herein are used descriptively rather than in a limiting sense, the scope of the invention being defined in the claim.

What I claim and desire to secure by Letters Patent is:

A filter cloth for use with a filter press composed of registering plates and frames having contacting portions near the edges to hold the edges of the filter cloth, the filter cloth having thickened portions registering with the contacting portions of the plates and frames, said thickened portions on two opposite parallel edges of the cloth comprising a portion of the same piece of cloth as that composing the filter but of heavier weave than the rest of the cloth, thereby producing a reinforced edge portion and thickened portions extending along the edges opposite to each other and transverse to the first mentioned edges comprising strips of fabric sewed to the filter cloth.

Signed by me at Baltimore, Maryland, this 12th day of March, 1926.

JAMES E. HOOPER.